United States Patent [19]
Shivak

[11] 3,747,963
[45] July 24, 1973

[54] HIGH VACUUM FLANGE ASSEMBLY WITH O-RING GASKET

[75] Inventor: Robert A. Shivak, Parma, Ohio

[73] Assignee: Cajon Company, Solon, Ohio

[22] Filed: May 17, 1972

[21] Appl. No.: 254,292

Related U.S. Application Data

[63] Continuation-in-part of Ser. No. 191,195, Oct. 21, 1971, abandoned.

[52] U.S. Cl.................. 285/336, 277/236, 285/363
[51] Int. Cl............................................. F16l 23/00
[58] Field of Search.................. 285/336, 363, 368, 285/DIG. 19; 277/170, 236, 235 A, 171, 211, 210, 209, 208, 215, 64, 117

[56] References Cited
UNITED STATES PATENTS

| | | | |
|---|---|---|---|
| 2,789,844 | 4/1957 | Kessler............................. | 285/336 |
| 3,208,758 | 9/1965 | Carlson et al................... | 285/336 X |
| 3,285,631 | 11/1966 | Stolpmann................... | 285/DIG. 19 |
| 2,761,707 | 9/1956 | Herman.......................... | 277/236 X |
| 1,834,581 | 12/1931 | Ferrell et al. ................... | 285/336 |
| 3,503,634 | 3/1970 | Cadiou............................ | 277/236 X |

FOREIGN PATENTS OR APPLICATIONS

| | | | |
|---|---|---|---|
| 712,786 | 7/1954 | Great Britain................. | 277/235 A |
| 990,438 | 4/1965 | Great Britain..................... | 277/236 |
| 1,004,002 | 3/1957 | Germany........................... | 277/236 |

Primary Examiner—Thomas F. Callaghan
Attorney—Albert P. Sharpe, III

[57] ABSTRACT

A vacuum joint construction wherein opposed flange faces each include an inwardly extending recess having an outer peripheral wall and a bottom wall. The bottom wall in each recess is provided with a pari of relatively closely spaced protuberances which extend about the bottom wall radially inwardly of the outer wall. Each protuberance is defined by a pair of side walls and has a height less than the height of the outer wall. The protuberances are each shown as having the shape of a one-quarter torus with their convex faces positioned in opposed relationship. The radial space between the apices of the protuberances is preferably related so as to be substantially equal to the thickness of a soft metal gasket to be positioned between two opposed faces. Also disclosed is the use of a metal O-ring gasket having a surface coating or layer of a soft metal such as silver. The O-ring is sized such so that on joint make-up, the convex faces of the protuberances wipingly engage its surface.

8 Claims, 10 Drawing Figures

PATENTED JUL 24 1973

HIGH VACUUM FLANGE ASSEMBLY WITH O-RING GASKET

This application is a continuation-in-part of U. S. Patent Application Ser. No. 191,195, filed Oct. 21, 1971 and now abandoned.

The subject invention is directed toward the art of tube or pipe joints and couplings and, more particularly, to an improved flange construction.

The invention is especially suited for use as a connecting flange in critical vacuum systems and will be described with particular reference thereto; however, as will become apparent, the invention is capable of broader application and could be used in either pressure or vacuum systems.

The typical connection used in critical vacuum systems comprises opposed flanges with a soft metal gasket positioned between them. The flanges are interconnected by bolts which draw the flanges axially together and apply the required sealing pressure to the metal gasket. The flange faces which engage the gasket have been provided with many different types of sealing faces including opposed knife edges, semi-circular protuberances, etc. The protuberances were driven into the gasket during joing make-up and provided the vacuum seal.

These prior joint constructions have suffered a variety of different problems. Some required a particularly high make-up torque before adequate penetration and sealing was achieved. That is, the flange bolts had to be tightened to an extremely high level. Other designs, although requiring only a moderate make-up torque, could not maintain a good seal with temperature cycling or under sustained high temperatues as experienced during bake-out in vacuum systems. Some designs, in addition to having one or the other of the above problems, also gave problems with regard to "virtual" leaks. Although ambient air or gas did not leak through the gasket and into the system, upon make-up of the joint, small quantities of air were trapped in the joint. Thereafter, this trapped air slowly leaked into the system.

The subject invention provides a joint construction of the general type described wherein the opposed flange faces each include an inwardly extending recess having an outer peripheral wall and a bottom wall. The bottom wall in each recess is provided with a pair of relatively closely spaced protuberances which extend about the bottom wall radially inwardly of the outer wall. Each protuberance is defined by a pair of side walls and has a height less than the height of the outer wall.

The protuberances each preferably have the shape of a one-quarter torus with their convex faces positioned in opposed relationship. The radial space between the apices of the protuberances is preferably related so as to be substantially equal to the thickness of a soft metal gasket to be positioned between the two opposed faces. Moreover, the height of the outer wall is preferably such that upon make-up, the opposed outer walls of the two flange faces engage and limit the depth of protuberance penetration in the gasket. Preferably, and in accordance with one aspect of the invention, the penetration is such that when the joint is made up, the four protuberances engage and enclose a portion of gasket material in an approximately equally spaced quadrant arrangement.

Because of the shape of the protuberances, substantial wiping takes place between the surfaces of the protuberances and the gasket during make-up. Moreover, because of the biaxial relationship between the gasket and the protuberances, the resulting joint is particularly good under rising temperature conditions since the thermal stresses acting within the confines of the protuberances are balanced to a substantial extent in both the radial and axial directions.

In addition to the advantages noted above, the subject invention further provides a joint in which make-up torque is relatively low. Further, the gasket material is trapped between the opposed protuberance and on a temperature rise can escape only by flowing through the constantly restricting space provided by the protuberances on opposed faces. This tends to build up a biasing force which, during cooling, maintains sufficient force on the joint.

The invention also contemplates that rather than a soft metal gasket, a metal O-ring member can be provided between the opposed flange faces. Preferably, the O-ring has a cross-sectional diameter so as to be closely received between the opposed protuberances on each flange face so that during make-up, all four of the protuberances simultaneously engage the O-ring at points spaced approximately 90 degrees apart about its cross-sectional circumference. Also, the O-ring preferably has a thin, soft metal coating, for example, silver, copper or the like, so that during make-up, the protuberances perform a wiping action on the soft surface of the O-ring. This produces a seal which is generally superior to a plain stainless steel O-ring. Moreover, with the soft coating the O-ring joint assembly is capable of undergoing substantial temperature cycling.

A primary object of the invention is the provision of a vacuum joint construction of the type described wherein the sealing gasket comprises a metal O-ring having a soft exterior surface.

Another object of the invention is the provision of a flange joint construction which has comparatively low make-up torque, extremely good sealing ability, and which is capable of withstanding substantial temperatre cycling without loss of sealing properties.

A further object is the provision of a flange face configuration which substantially reduces make-up torque and provides good wiping between the sealing protuberances and the gasket member.

A still further object is the provision of a joint of the general type described which can be used with conventional flat soft metal gaskets or metal O-rings, or various plastic and synthetic gaskets.

The above and other objects and advantages will become apparent from the following description when read in conjunction with the accompanying drawings wherein.

Figure 4:
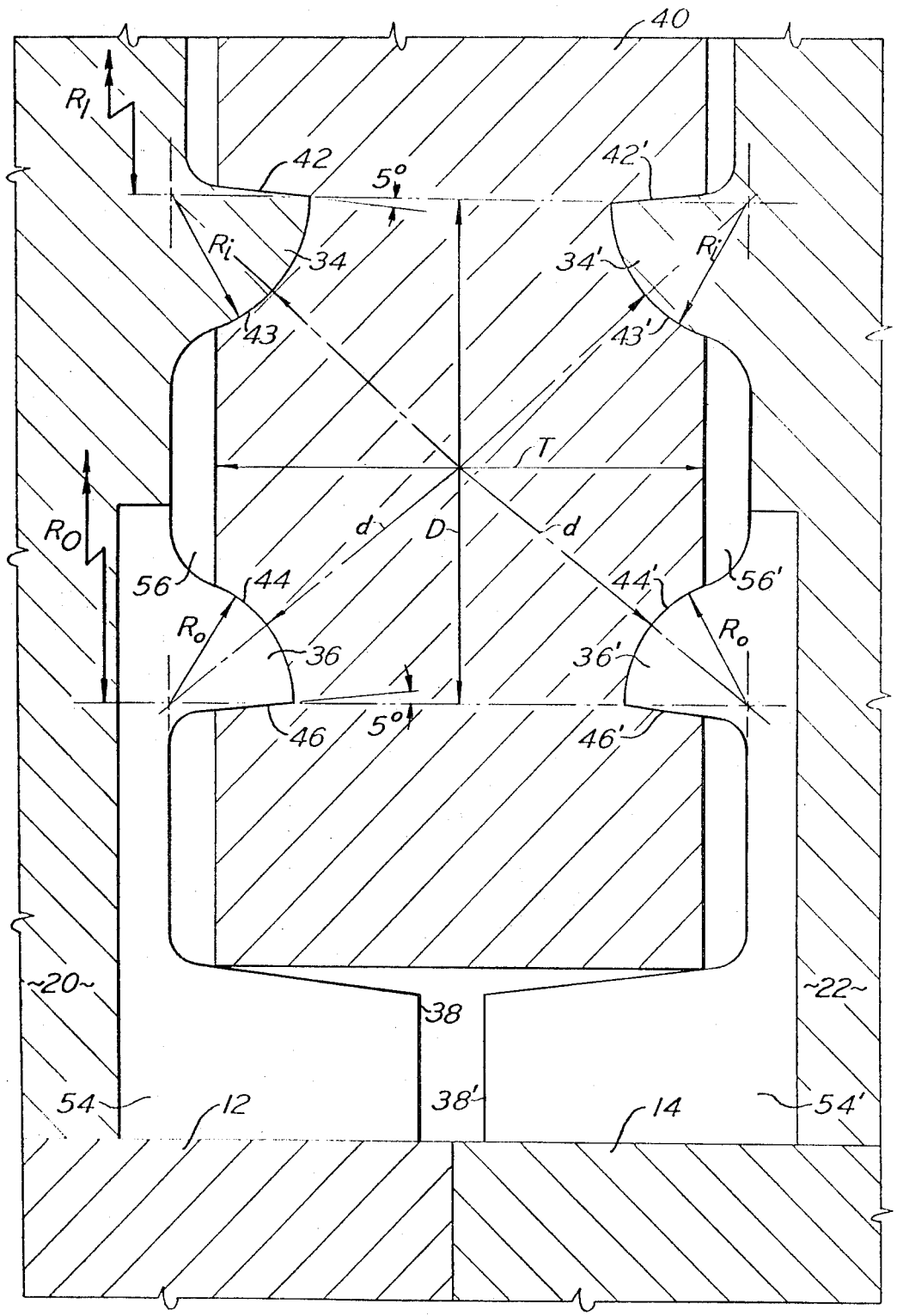
FIG. 4 is a greatly enlarged view of the circled portion of FIG. 3.
Figure 5:
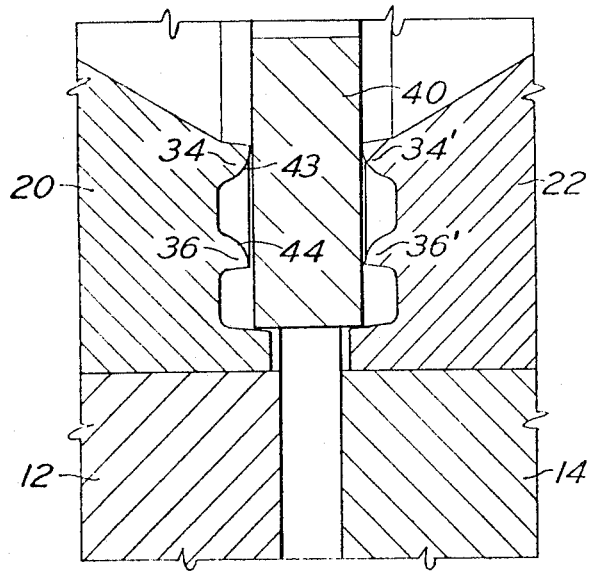
FIGS. 5 and 6 are views similar to FIG. 4 at a reduced scale and showing the joint at the start of make-up and at an intermediate point of make-up.
Figure 6:
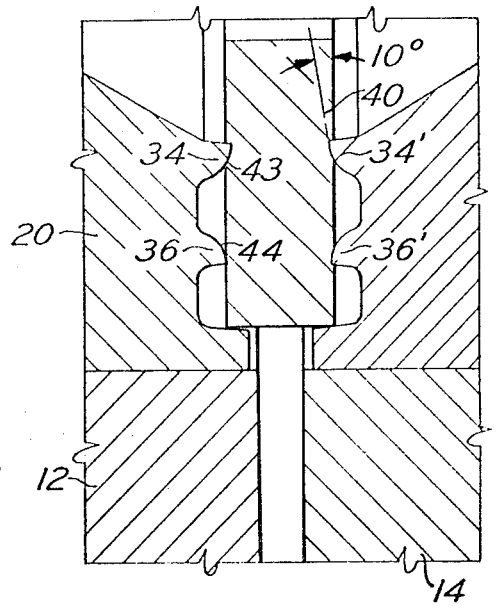
Figure 7:
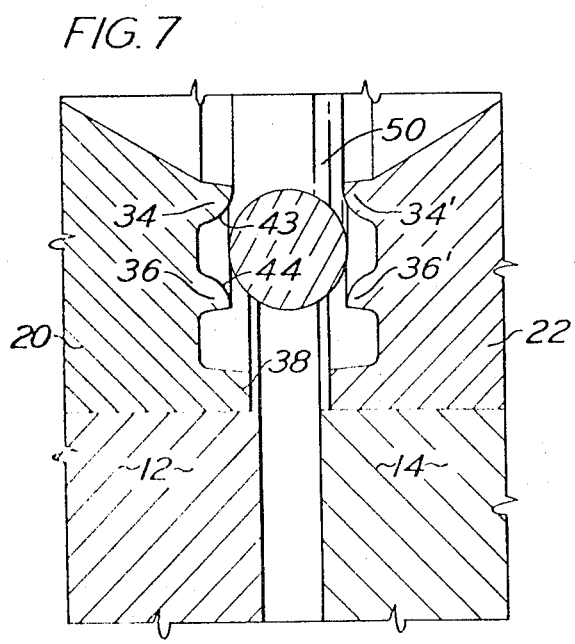
Figure 8:
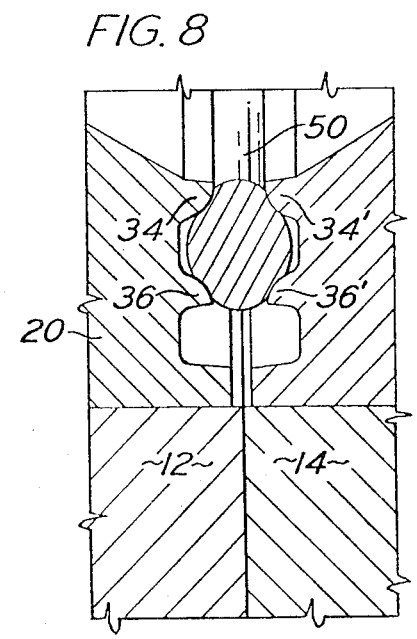
Figure 10:
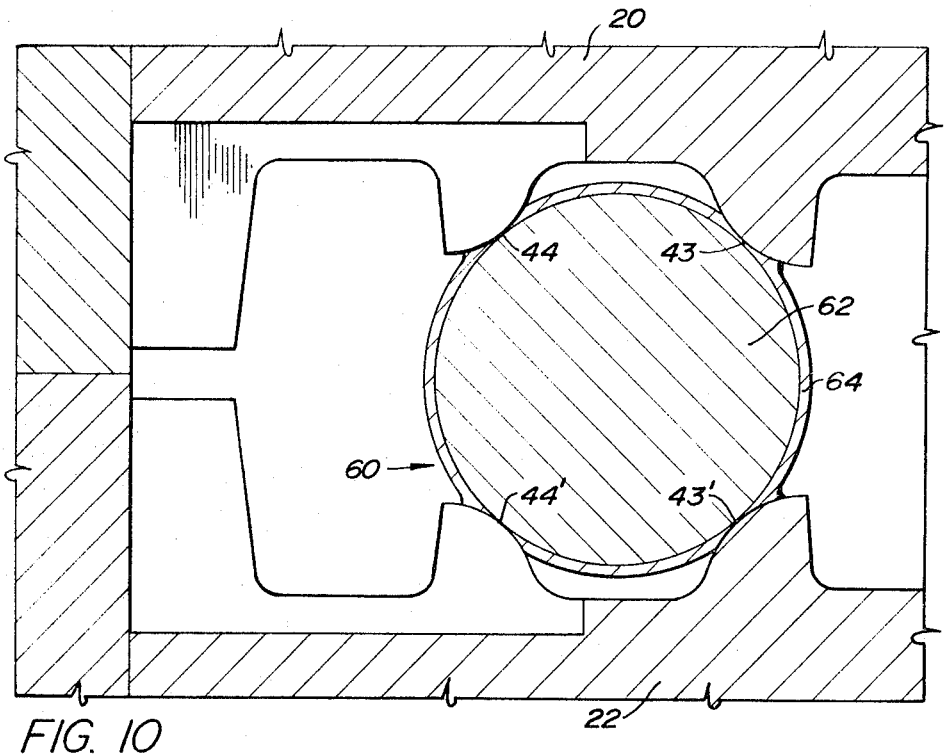
Figure 9:
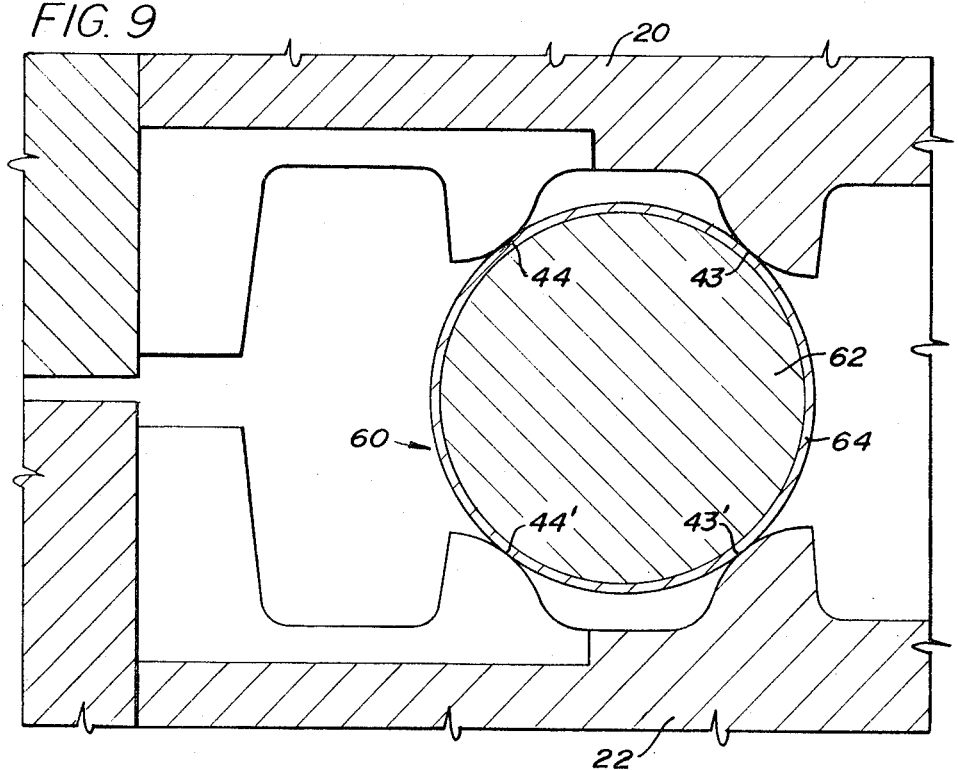

FIGS. 7 and 8 are views similar to FIGS. 5 and 6 but showing a modified form of O-ring gasket at the start and completion of joint make-up respectively; and, FIGS. 9 and 10 are partial cross-sectional views similar to FIG. 4 but showing, respectively, a joint at the start and completion of make-up with a metal O-ring gasket having a soft metal coating.

Figure 1:
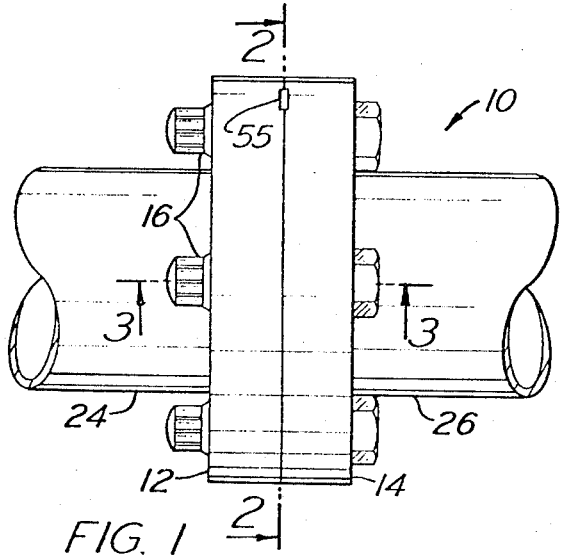
FIG. 1 is a side elevation of a typical joint construction incorporating the subject invention.
Figure 2:
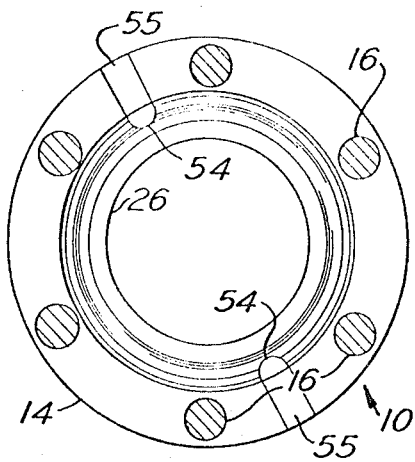
FIG. 2 is a cross-sectional view taken on line 2—2 of FIG. 1.
Figure 3:
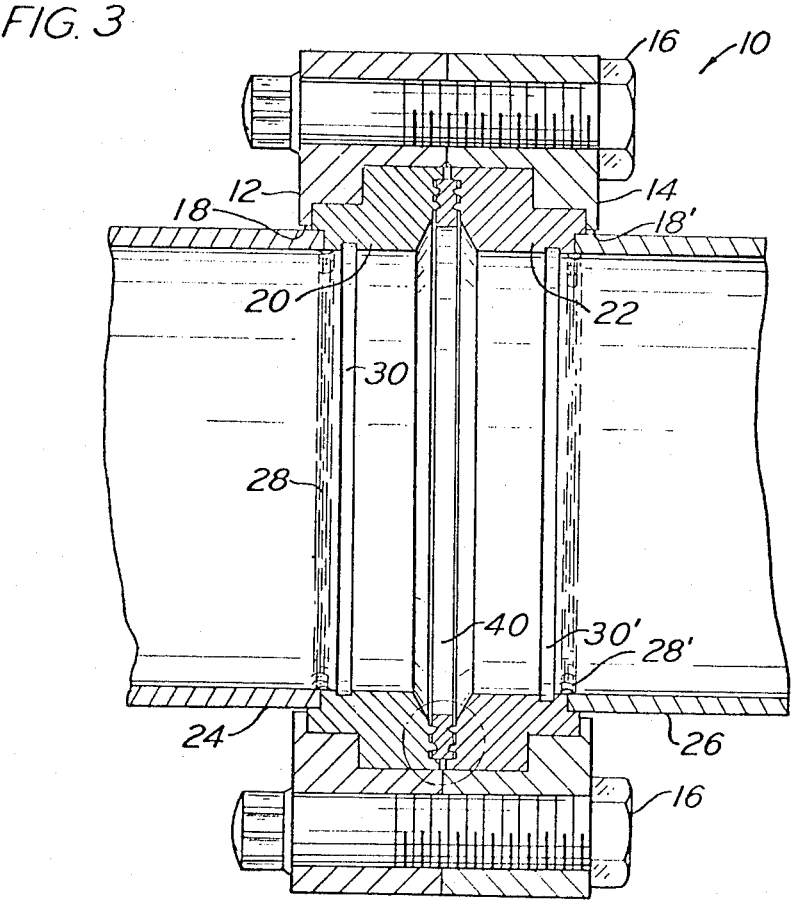
FIG. 3 is an enlarged cross-sectional view taken on line 3—3 of FIG. 1.

Referring more particularly to the drawings wherein the showings are for the purpose of illustrating the preferred embodiments of the invention only and not for the purpose of limiting same, FIGS. 1 through 3 show the overall arrangement of a typical vacuum joint assembly incorporating features of the invention. As will become apparent hereafter, many of the details of the joint assembly shown could vary widely within the scope of the invention; however, the joint assembly 10 is broadly shown as including a pair of opposed flange ring members 12 and 14 which are of identical construction and interconnected by a plurality of relatively high strength bolts 16. Both of the flange ring members are illustrated as being of identical configuration and each have a generally cylindrical configuration with a center bore 18 extending therethrough. In the embodiment under consideration, the flange ring members are preferably formed from stainless steel as is customary for high vacuum systems. Each of the flanges includes an insert member 20, 22, respectively which is received in recesses formed in the respective flange rings.

In the embodiment under consideration, vacuum lines 24 and 26 are received in the inserts. As shown, the lines are preferably received and continuously welded about their interiors as shown at 28. A stress relief groove 30 is preferably formed adjacent the weld area so that during the welding operation, internal stresses which could deform the flange will not be set up. The separate flange ring and insert described is generally referred to as a "rotatable" joint construction in that the lines 24 and 26 can be rotated relative to one another prior to joint make-up. As will become apparent, the invention contemplates that the respective flange ring members and inserts could be integrally formed for a non-rotatable joint, if desired.

The structure thus far described is relatively conventional and could vary substantially from that shown. Of particular importance to the subject invention, however, is the arrangement of the seal portion of the flange inserts.

In the embodiment shown, each of the inserts is of identical construction. Accordingly, only one will be described in detail and like reference numerals differentiated by a prime (') suffix will be used to identify corresponding elements. As best shown in FIGS. 4 through 6, each of the flange insert members includes a continuous circumferentially extending pair of protuberances 34 and 36 preferably having the general shape of one-fourth of a circular torus. Additionally, it should be noted that each of the flange inserts includes an outer wall or shoulder 38 which projects beyond the protuberances. This serves to pilot the gasket member 40 during make-up of the joint and prevents the outer flange rings from knocking off the gasket during assembly. Further, the wall serves to protect the protuberances from being hit during shipping and handling.

Positioned between the two opposed flange inserts is the gasket member 40 which is preferably formed from a dissimilar, softer metal. For example, the flange insert members are preferably formed from stainless steel and the gasket from a comparatively soft copper. Other combinations of metal and/or plastics or synthetics could be used depending upon service requirements.

The shape, arrangement and location of the protuberances is relatively important to the invention. As shown, the inner protuberances 34 have a first radially inner face 42 which is preferably inclined only a slight amount relative to the axial center line of the joint. Preferably, the angle of the inclination is in the range of approximately 5°. The reason for this inclination will subsequently be explained. The radially outer surface 43 of the inner protuberance is in the form of a quarter circle having a radius $R_i$. Thus, the radially innermost protuberance has the general shape of a ¼ torus bead.

The outermost protuberance 36 on each of the opposed flange faces is similar in shape to the inner protuberance. It should be noted, however, that the radial inner face 44 is of circular configuration and the outer face 46 is slightly inclined relative to the axial center line of the joint. The radius of the inner face of the outer protuberance is identified in the drawing as $R_o$. As will be discussed hereafter, $R_o$ is nearly equal to $R_i$ so that during gasket make-up, the outer protuberance will penetrate the soft metal gasket to nearly the same extent as the inner protuberance.

Preferably the radial distance D between the apices of the protuberances is approximately equal to the thickness T of the gasket.

The particular embodiment under consideration is a gasket assembly for tubing having an outer diameter of 1 ½ inches. For this particular gasket size, the crown of the inner protuberance is preferably located at a radius $R_i$ of about 0.825 inches and the crown of the outer radius is located at a radius $R_o$ of about 0.905 inches. Further, the outer protuberance has a radius $R_o$ equal to approximately 0.022 inches.

The inner protuberances are completely continuous about the joint and form the primary seal. In a joint having the dimensions given, each of the inner protuberances preferably penetrate the gasket to a depth of 0.015 inches. the penetration of the gasket is controlled by the flange ring. That is, the flange ring members are sized so that upon proper make-up, their outer peripheral walls come into face-to-face contact as shown in FIG. 4.

FIGS. 5 and 6 illustrate the make-up of the joint and, together with FIG 4, best illustrate operation of the joint. As shown in FIG. 5, at the start of make-up, the gasket is centered by the walls 38 and properly positioned between the opposed flange faces. As the bolts are tightened, penetration of the gasket begins. During the first increments of penetration, high surface contact between the protuberances and the gasket is not obtained. This is due to the angular contact and penetration depth of the protuberances. Further, during this period, there is only a transfer of surface made on the softer material. That is, there is little or no wiping action between the protuberances and the gasket material.

When penetration has taken place to a point wherein a tangent point on the curved faces of the protuberances makes a critical angle with a plane perpendicular to the axis of the joint, high surface contact is effected. In the embodiment under consideration, this angle is approximately 10 degrees, as shown in FIG. 6. However, the angle will vary with dimensional variations. Continued penetration of the protuberances into the gasket increases the angle of penetration. This increases the efficiency of surface contact between the protuberances and the gasket due to a sliding or wiping effect. The wiping proceeds through a peak from a tangent point at 10° to a tangent point of 80° on the curved surface of the protuberance. The relationship of wiping to angle of penetration is not the same for deeper penetrations. Further, the required angular tangent point of 10° decreases as the softer gasket material is conditioned by deeper penetration of the bead. In the subject embodiment, a penetration of 0.015 inches produces good wiping up to the apex of the protuberance where the angle of penetration is nearly 0°. On the straight radially inner faces of the inner protuberances, the 5° support angle produces limited wiping along its surface at its deeper points of penetration. This limited wiping on the inner surface reduces the likelihood of a virtual leak along this portion of the protuberance.

Although not critical to the invention, the wiping efficiency of the protuberance and gasket can be increased by highly polishing the protuberances and lapping the gasket.

Upon completion of the make-up of the joint, the gasket is uniformly gripped by the quad-arrangement of the opposed protuberances. This arrangement tends to place the gasket material within the quad-arrangement under substantial biaxial compression since during make-up, the gasket material is forced inward, perpendicular to the tangent points on the arcuate faces of the protuberances. The compression force is contained, since in order for the gasket to escape its confinement, it must flow outward between the reducing areas formed by the arcs of the quarter toroidal portions of the protuberances.

The preferred relationship between the protuberance spacing, gasket thickness, and penetration is best illustrated in FIG. 4. Note that these should preferably be related such that upon make-up of the joint, the diagonal distances d between diagonally opposite protuberances are substantially equal to the gasket thickness,. This tends to equalize forces acting upon the joint during temperature cycling.

Under temperature cycling, the flange components are subjected to expansion and contraction about their natural axes. By keeping the distance between the inner and outer protuberances to a minimum, and within the same member on either side of the gasket, the movements of the sealing surfaces are held to a minimum. What movements there are, are mostly relative to radial movement. Additionally, a smaller lever arm between the inner protuberance and the bolt surface reduces the relaxation of compression upon the gasket when the yield strength of the assembly is reduced at high temperatures.

Although the use of a soft metal, flat faced gasket of the type shown in the FIGS. 1 through 6 embodiment is preferred, other types of gaskets can be used with the flange configuration described above. For example, FIG. 8 shows how the assembly can be used with a metal 0-ring gasket. Preferably, the 0-ring gasket 50 is sized so that it is simultaneously engaged by all four protuberances in the joint. During make-up, the gasket is deformed as illustrated in FIG. 8. Simultaneously with the make-up, a wiping action takes place between the protuberance faces and the exterior surface of the 0-ring. Like the FIGS. 1 through 6 embodiment, a seal is achieved with comparatively low make-up torque requirements.

Because of the shape, configuration and location of the protuberances, the overall torque requirements for make-up of the joint are not particularly high. Moreover, because substantially all sealing and gasket containment takes place between the four protuberances, variations in the radial dimensions of the gaskets do not have any particular effect upon the sealing properties of the joint. That is, containment of the gasket material within the protuberances to provide a proper seal is assured irrespective of variations in gasket dimensions in a radial direction, at least with respect to the flat type gasket.

Virtual leaks from the area between the protuberances and the gasket face are prevented by the provision of machined slots 54, 55 which extend radially inward from the outer faces of the flange ring members and the inserts (see FIG. 2). The slots 55 also serve to permit insertion of a tool to aid in separating the joint during disassembly. Referring to FIG. 4, it will also be seen that the groove or slot 54 extends inwardly through the outer protuberance 36. This serves to vent the small space 56 between the protuberances to prevent virtual leaks.

FIGS. 9 and 10 illustrate a preferred form of the joint construction using an 0-ring type sealing gasket. In this embodiment, an 0-ring 60 is adapted to fit between the opposed flanges 20, 22 and within the space enclosed by the convex surfaces 43, 43' and 44, 44'. The 0-ring 60 is illustrated as a solid metal 0-ring (as opposed to a hollow ring) formed with a relatively hard, rigid interior 62 and a substantially softer exterior surface comprising a metal coating 64. In the embodiment under consideration, the interior portion 62 of the ring 60 is formed from stainless steel and the exterior surface is a coating of silver of at least about 0.002 inches in thickness. Other combinations of metal could be used depending upon service conditions, flange material, etc. It is important, however, that the metal coating of the gasket be substantially softer than the flange protuberances. Also, the softer outer coating should preferably be supported by a hard, relatively rigid interior. Although the interior of the 0-ring should be sufficiently hard and dimensionally stable to prevent crushing during make-up, it can be hollow or solid.

The size of the 0-ring is selected so that the protuberances first engage the 0-ring as shown in FIG. 9. During tightening of the flanges to the final make-up position shown in FIG. 10, the protuberances penetrate and wipe the soft outer surface of the 0-ring. In the final make-up assembly the 0-ring is totally confined between points perpendicular to the tangent points of the 0-ring and the four, quarter toroid surfaces.

The invention has been described in great detail sufficient to enable one of ordinary skill in the art to make and use the same. Obviously, modifications and alterations of the preferred embodiment will occur to others upon a reading and understanding of the specification and it is my intention to include all such modifications and alterations as part of my invention insofar as they come within the scope of the appended claims.

What is claimed is:

1. A flange joint construction comprising:
    a pair of flange members having opposed faces;
    each of said opposed faces having aligned recesses formed therein with each recess including a bottom wall and a peripheral side wall;
    the bottom wall of each recess including at least two radially spaced inner and outer circumferential protuberances of a height less than the height of the peripheral side wall, each protuberance being defined by side walls meeting at an apex with the radially inner side wall of the inner protuberance and the radially outer side wall of the outer protuberance being relatively flat and inclined slightly toward one another;

the radially outer side wall of the inner protuberance and the radially inner side wall of the outer protuberance being convex and having the configuration of substantially one-quarter of a torus and at the apex forming with the other side wall an angle in the range of 60° to 120°;

the protuberances in each face being aligned with those of the opposed face;

a gasket formed from a material softer than said protuberances positioned between said faces and having an axial thickness generally equal to the radial spacing between the apices of the protuberances on the same flange face and a radial extent sufficient for engagement by the apices of the radially inner and outer protuberances on each flange face continuously about their circumferential extent; and, means for drawing said flange faces together to cause said protuberances to penetrate said gasket, with said peripheral side walls limiting penetration such that upon make-up of the joint, the diagonal distance between diagonally opposed protuberances on the opposed flange faces is substantially equal to the axial thickness of the gasket.

2. The flange joint construction as defined in claim 1 wherein the radially inner side wall of the inner protuberance and the radially outer side wall of the outer protuberance each form an obtuse angle with the bottom wall.

3. The flange joint construction as defined in claim 1 wherein the convex walls have an arcuate extent of at least 70°.

4. The flange joint construction as defined in claim 1 wherein the height of said inner protuberance is slightly greater than the height of said outer protuberance.

5. The flange joint construction as defined in claim 1 wherein said convex surfaces are defined by the arc of a circle having its center on a line perpendicular to the bottom wall and passing through the apex of the respective protuberance.

6. A flange joint construction comprising:
a pair of flange members having opposed faces;
each of said opposed faces having aligned recesses formed therein with each recess including a bottom wall and a peripheral side wall which extends outwardly to the face of its respective flange member;

the bottom wall of each recess including at least two radially spaced inner and outer circumferential protuberances of a height less than the height of the peripheral side wall, each protuberance being defined by side walls meeting at an apex with the radially inner side wall of the inner protuberance and the radially outer side wall of the outer protuberance being relatively flat and inclined slightly toward one another;

the radially outer side wall of the inner protuberance and the radially inner side wall of the outer protuberance being convex and at the apex forming with the other side wall an angle in the range of 60° to 120° and the protuberances on each face being generally aligned with those on the opposite face;

said convex surfaces being defined by the arc of a circle having its center on a line perpendicular to the bottom wall and passing through the apex of the respective protuberance;

a gasket formed from a material softer than said protuberances positioned between said opposed flange faces with the axial thickness of said gasket being nearly equal to the spacing between adjacent apices of the protuberances on each flange face, said gasket further having a radial extent sufficient for engagement and penetration by the convex faces of the radially inner and outer protuberances on each flange face continuously about their circumferential extent;

means for drawing said flange faces together to bring the peripheral side walls into engagement; and, the peripheral side walls having a height such that when they are brought into engagement, the gasket is penetrated by an amount such that the diagonal distance between diagonally opposed protuberances is substantially equal to the gasket thickness.

7. The flange joint construction as defined in claim 6 wherein said gasket comprises an O-ring with a radial inner diameter substantially equal to the diameter of the radially inner protuberance and an outer diameter substantially equal to the diameter of the radially outer protuberance.

8. The flange joint construction as defined in claim 7 wherein said O-ring has a ductile metal coating.

* * * * *